(12) United States Patent
Gracia Caroca et al.

(10) Patent No.: US 11,299,396 B2
(45) Date of Patent: Apr. 12, 2022

(54) SYSTEM FOR THE PRODUCTION OF CARBON NANOTUBES FROM CARBON MATTER, PREFERABLY, PLASTIC WASTE AND SOLAR ENERGY; METHOD OF PRODUCTION

(71) Applicant: UNIVERSIDAD DE CHILE, Santiago (CL)

(72) Inventors: Francisco Gracia Caroca, Santiago (CL); Mauricio Morel Escobar, Santiago (CL); Vania Jocelyn Rojas Fuentes, Santiago (CL); Gerardo Cabrera Papamija, Santiago (CL); Nicolas Carvajal, Santiago (CL)

(73) Assignee: UNIVERSIDAD DE CHILE, Santiago (CL)

( * ) Notice: Subject to any disclaimer, the term of this patent is extended or adjusted under 35 U.S.C. 154(b) by 189 days.

(21) Appl. No.: 16/628,490

(22) PCT Filed: Jun. 26, 2018

(86) PCT No.: PCT/CL2018/050048
§ 371 (c)(1),
(2) Date: Jan. 3, 2020

(87) PCT Pub. No.: WO2019/006569
PCT Pub. Date: Jan. 10, 2019

(65) Prior Publication Data
US 2020/0180961 A1    Jun. 11, 2020

(30) Foreign Application Priority Data
Jul. 3, 2017 (CL) .................................. 1754-2017

(51) Int. Cl.
*C01B 32/16* (2017.01)
*F24S 50/20* (2018.01)
(Continued)

(52) U.S. Cl.
CPC ............... *C01B 32/16* (2017.08); *B01J 29/46* (2013.01); *B09B 3/00* (2013.01); *B29B 17/04* (2013.01);
(Continued)

(58) Field of Classification Search
CPC ..... C01B 32/16; C01B 32/158; C01B 32/159; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08;
(Continued)

(56) References Cited

U.S. PATENT DOCUMENTS 5,556,517 A * 9/1996 Smalley ................. C01B 32/15
204/157.47

OTHER PUBLICATIONS

Zeaiter, et al., Design of an automated solar concentrator for the pyrolysis of scrap rubber, Energy Conversion and Management 2015; 101: 118-125 (Year: 2015).*
(Continued)

*Primary Examiner* — Daniel C. McCracken
(74) *Attorney, Agent, or Firm* — Lucas & Mercanti, LLP (57) ABSTRACT

The present invention relates to a system for the production of carbon nanotubes from carbonaceous matter, preferably, plastic waste and solar energy; Method of production.

33 Claims, 5 Drawing Sheets

(51) Int. Cl.
  *F24S 23/30* (2018.01)
  *F24S 30/48* (2018.01)
  *B01J 29/46* (2006.01)
  *B09B 3/00* (2022.01)
  *B29B 17/04* (2006.01)
  *B82Y 30/00* (2011.01)
  *B82Y 40/00* (2011.01)

(52) U.S. Cl.
  CPC .............. *F24S 23/30* (2018.05); *F24S 30/48* (2018.05); *F24S 50/20* (2018.05); *B29B 2017/0496* (2013.01); *B82Y 30/00* (2013.01); *B82Y 40/00* (2013.01)

(58) Field of Classification Search
  CPC ............ C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; F24S 50/20; F24S 23/30; F24S 30/48; F24S 30/425; B01J 29/46; B01J 19/08; B01J 19/12; B09B 3/00; B09B 5/00; B09B 3/0083; B29B 17/04; B29B 2017/0496; B82Y 30/00; B82Y 40/00; Y02W 30/20; Y02P 20/133; Y02E 10/47; Y02B 10/20; C08J 11/04; C10B 49/00; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
  See application file for complete search history.

(56) References Cited

OTHER PUBLICATIONS

Chibante, et al., Solar Generation of the Fullerenes, J. Phys. Chem. 1993; 37: 8696-8700 (Year: 1993).*

Fields, et al., Formation of Fullerenes in Highly Concentrated Solar Flux, J. Phys. Chem. 1993; 97: 8701-8702 (Year: 1993).*

Bernier, et al., Production of fullerenes from solar energy, Synthetic Metals 1995; 70: 1455-1456 (Year: 1995).*

Laplaze, et al., Preparation of fullerenes using a solar furnace, Synthetic Metals 1996; 77: 67-71 (Year: 1996).*

Laplaze, et al., Carbon sublimation using a solar furnace, Synthetic Metals 1997; 86: 2295-2296 (Year: 1997).*

* cited by examiner

SYSTEM FOR THE PRODUCTION OF CARBON NANOTUBES FROM CARBON MATTER, PREFERABLY, PLASTIC WASTE AND SOLAR ENERGY; METHOD OF PRODUCTION

FIELD OF THE INVENTION

The present invention refers to a system for the production of carbon nanotubes from carbonaceous matter, preferably, plastic waste and solar energy; Method of production.

STATE OF ART

Large amounts of plastic waste is generated worldwide every year. Each year, 8 million metric tons of plastic end up in oceans, which is equivalent to five supermarket bags filled with plastic for each foot of coast in the world. An accumulated entry of 20 times the current amount is projected for the year 2025, which will be reflected in almost 100 supermarket bags filled with plastic per foot of coast in the world [http://plastic-pollution.org/]. Out of all plastic waste, plastic bags are a serious threat to the natural ecosystem and it has already been reported that particles generated by their degradation have harmful effects on aquatic and terrestrial animals [Environment Protection and Heritage Council. Decision Regulatory Impact Statement—Investigation of options to reduce the impacts of plastic bags. Australia; 2008]. Despite the big efforts being made to recycle plastic waste, recycling rates continue to be very low, whereby still a lot of plastic end up in dumps, representing a waste of valuable resources. It is here, where the conversion of plastic waste into products with high added value is presented as an alternative to considerer. [Jonathan C. Acomb, Chunfei Wu, Paul T. Williams. Control of steam input to the pyrolysis-gasification of waste plastics for improved production of hydrogen or carbon nanotubes. Applied Catalysis B: Environmental 147 (2014) 571-584].

Carbon nanotubes (CNTs) are one of the most important nanostructures carbon materials today, and have captivated much interest since their discovery in 1991. This, due to its varied structures and properties, such as, its tensile strength 100 times greater than steel, its high environmental and chemical stability, its thermal conductivity comparable to diamond, and an electrical conductivity comparable to cooper. These properties offer big growth potential in different industries, from textiles, electronics, microwave absorption, actuators, biomedical, to water purification. A market size for carbon nanotubes of USD $5.64 billion with a compound annual growth rate (CAGR) of 20.1% is projected for 2020 [Market Study the Global Market for Carbon Nanotubes. Future Markets, Abril 2016].

The carbon nanotube industry is growing rapidly, and more carbon nanotube are available in the market in different ways to be explored and marketed as different products. Companies such as DexMat, Advanced Research and Technologies PTE, and Applied Nanotech, Inc./Pen, Inc., produce carbon nanotubes for the textile industry, anti-corrosion and electronic products. However, the price of carbon nanotubes continues to be very high as a consequence of high processing cost and product purification, high equipment costs, limited scalability of manufacturing method, and low productivity.

The technologies used at industrial level for the production of carbon nanotubes are demanding in energy and resources, and include, but are not limited to: electric arc discharge technology, laser ablation technology, chemical vapor deposition (CVD) technology, catalytic chemical vapor deposition (CCVD), flame synthesis technology, and solar energy technology. These methods use gaseous carbon from ultrapure gases ($CH_4$, $C_2H_4$, CO, among others) as carbon source, which have a high cost-benefit ratio due to low energy exploitation or expensive graphite targets. This is why, more efficient and cost-effective technologies for the large-scale production of these materials are sought today (CNT's). In this sense, the plastic inclusion as a carbonaceous raw matter has been an option that has been developing for 10 years, due to the high carbon content in polyolefins (low and high-density polyethylene; polypropylene and polystyrene) of 85% by weight. In this regard, the production of CNT from plastic has been successfully demonstrated on a laboratory scale [Alireza Barargan, Gordon McKay. A review-Synthesis of carbon nanotubes from plastic wastes. Chemical Engineering Journal 195-196 (2012) 377-391].

V. G. Pol [V. G. Pol, P Thiyagarajan. Remediating plastic waste into carbon nanotubes. J. Environ. Monit. 12 (2010) 455-459] discloses a system for the carbon nanotubes from plastic waste using a reactor that is placed inside an electric furnace to reach the process temperature (>750° C.). However, since the whole process is presented in a single pressurized chamber at 1000 psi, a maximum plastic utilization is not achieved, either carbon nanotubes of long length. On the other hand, [Z. Jiang, R. Song, W. Bi, J. Lu, T. Tang. Polypropylene as a carbon source for the synthesis of multi-walled carbon nanotubes via catalytic combustion. Carbon 45 (2007) 449-458] discloses a two-stage carbon nanotube production process, these being: i) Degradation of the polymer in a helical screw reactor by mechanical and thermal effect, and ii) formation of carbon nanotubes using a CVD reactor. However, the process requires a large amount of electrical energy to operate the two process stages. In another approach, Ren-Xuan [Yang [Ren-Xuan Yang, Kui-Hao Chuang, Ming-Yen Wey. Carbon nanotube and hydrogen production from waste plastic gasification over Ni—Al.SBA-15 catalyst: effect of aluminum content. RSC Adv-. 2016, 6, 40731-40740] discloses a laboratory scale fluidized bed reaction system connected to three parallel catalysis reactors. The system uses as a catalyst Ni/Al-SBA-15 and as a source of carbon polypropylene grade pellets and polyethylene bags. However, the process requires a large amount of electrical energy to operate the two process stages. Ganesh Bajad [Ganesh Bajad, Venkanna Guguloth, R. P Vijayakumar & Suryasarathi B. Conversion of plastic waste into CNTs using Ni/Mo/MgO catalyst—An optimization approach by mixture experiment. Journal Fullerenes, Nanotubes and Carbon Nanostructures 24 (2) (2016) 162-169] discloses an equipment based on a muffle furnace where the combustion of polypropylene and catalyst for the synthesis of carbon nanotubes occurs. However, the process in inefficient and slow, in addition to consuming a large amount of electrical energy.

WO2015026294 discloses a two-zone reactor equipment (one of pyrolysis and another of nanotube synthesis), which uses convection heating and does not use a catalyst. However, because of the absence of a catalyst, synthesis time is long, making it impractical for scaling due to high energy consumption.

CN 104787747A discloses an equipment that uses the microwave principle and the method to prepare multi-walled carbon nanotubes by means of improved fast pyrolysis with microwave, for which raw matter such as biomass and/or carbonaceous organic waste, such as plastic, are used. However, because both reactions (polymer degradation and nanotube synthesis) are carried out in the same environment, the materials are not used very much, in addition to that, there is no control of the carbon nanotubes produced and no catalyst is used, but rather a microwave absorbent material, making it impractical for scaling.

Other technologies that seek to take advantage of plastic potential for the production of carbon nanotubes are displayed in the document WO2015/034430A and CN103232031B. WO2015/0344301A1 shows an equipment where heating is produced by induction (it is no solar), and where the catalyst is required to contain ferromagnetic phases that allow it to levitate on the face of a magnetic field, and therefore, its internal configuration is not suitable for operation by solar radiation. CN103232031B discloses the preparation of a Fe/CNT composite obtained from the use of an autoclave to mix iron based catalyst and an accelerator to polymer degradation, and where the composite synthesis and the polymer degradation are carried out in a single chamber inducing the product contamination, also its internal configuration does not allow an operation based on solar radiation.

In accordance with the above, another big challenger detected within the ecosystem of production of carbon nanotubes that affect directly on cost, falls on the high energy consumption as result from the required temperatures for the carbon nanotubes synthesis (>700° C.); independent of the carbon source (gas or solid) and the energy source. Before this scenario, the adoption of Non-Conventional Renewable Energy (NCRE), such as solar energy, appears as a consideration, an option for cost reduction in the production of this important nanomaterial. Regarding this, since 1993 the work carried out by French group Groupe de Dynamique des Phases Condensèes (CNRS-Université de Montpellier II) has reported the development of a solar reactor that allows the synthesis of fullerenes and carbon nanotubes, going from a laboratory reactor to a medium-scale production [Tony Guillard, Gilles Flamant, Jean-Francois Robert, Bruno Rivoire, Joseph Giral, Daniel Laplaze. Scale up of a solar reactor for fullerene and nanotube synthesis. Transactions of the ASME Vol. 124 (2002) 22-28 y D. Luxembourg, G. Flamant, D. Laplaze. Solar synthesis of single-walled carbon nanotubes at medium scale. Carbon 43 (2005) 2302-2310]. However, due to the technology configuration, it is impossible to incorporate plastic waste as raw matter for the carbon nanotubes production.

Based on the foregoing background, it is an objective of the present invention to overcome the drawbacks of the state of the art by incorporating carbonaceous matter, preferably, plastic waste in the production of carbon nanotubes using solar radiation (eliminating the dependence on the electricity grid), by providing a low cost and low complexity production system, to obtain carbon nanotubes (CNT) from carbonaceous matter including polypropylene, high density polyethylene or mixtures of both, among others and which uses solar radiation as energy source.

BRIEF DESCRIPTION OF THE INVENTION

The present invention provides a low cost and low complexity production system for obtaining carbon nanotubes (CNT) from carbonaceous matter, preferably plastic waste, including polypropylene, high density polyethylene or mixtures of both, among others and which uses solar radiation as energy source. The system comprises different components, and where the CNTs are produced by the movement of the upper support medium, along (X-axis) and/or (Y-axis) with respect to the lower support medium, in relation to the movement of the sum. The system also comprises a reaction medium, preferably a two-zone reactor (a carbonaceous matter pyrolysis zone, and another carbon nanotube synthesis zone that integrates the production system.

DETAILED DESCRIPTION OF THE INVENTION

Figure 1:
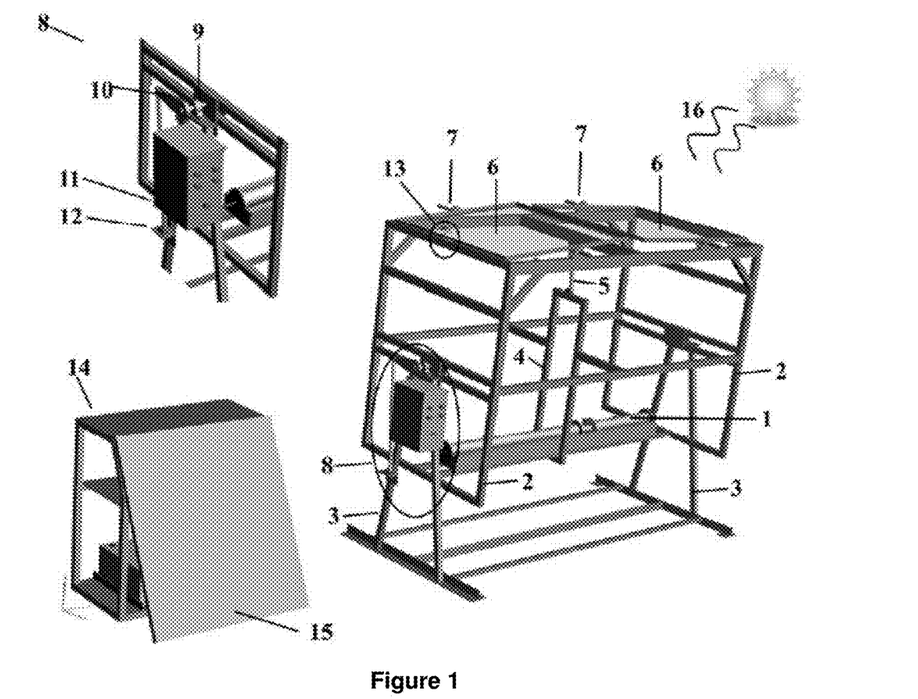
FIG. 1 shows a scheme of the system of carbon nanotubes (CNT) from plastic waste and which uses solar radiation as energy source.
Figure 2:
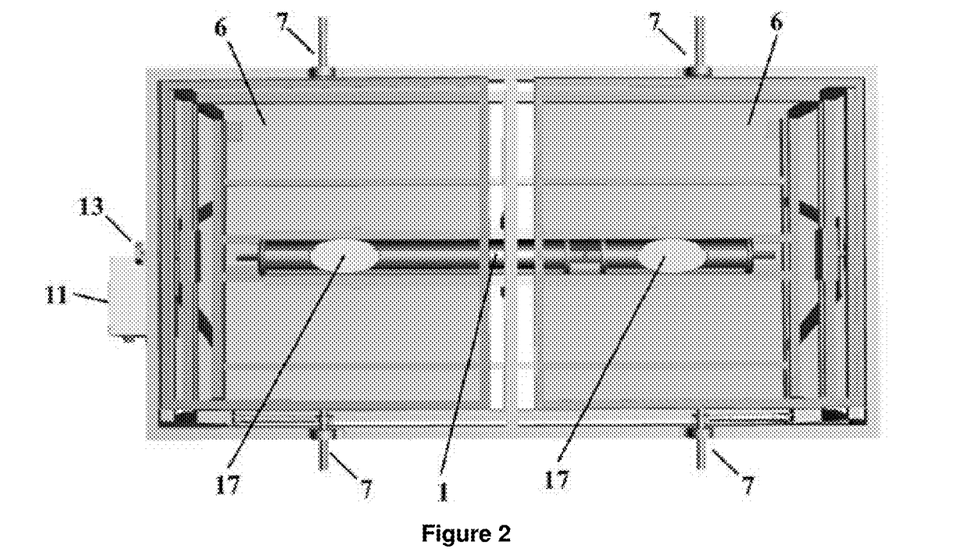
FIG. 2 shows a top view of the scheme of the carbon nanotubes (CNT) production system observed in FIG. 1.
Figure 3:
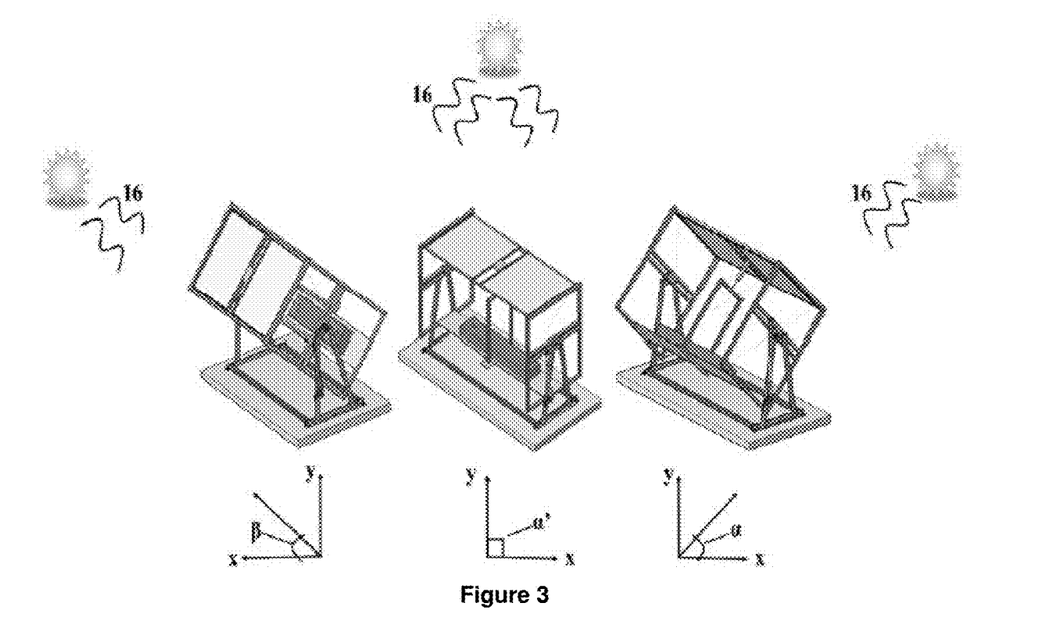
FIG. 3 shows a scheme of the carbon nanotube (CNT) production system of FIG. 1, where it is possible to observe the movement of the upper support medium along (X-axis) and/or (Y-axis) with respect to the lower support medium, in relation to the movement of the sum.
Figure 4:
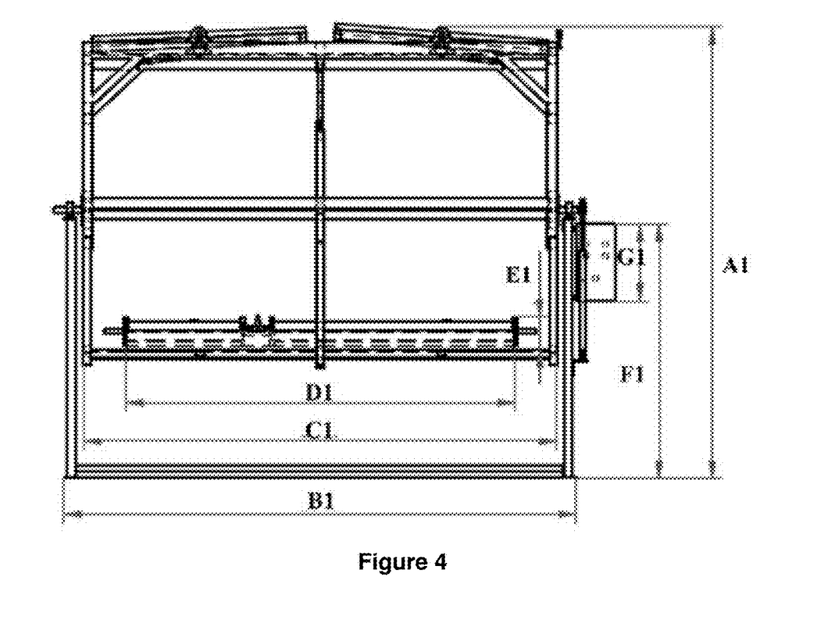
FIG. 4 shows a front view of the scheme of the carbon nanotubes (CNT) production system observed in FIG. 1, where dimensionality parameters are perceived.
Figure 5:
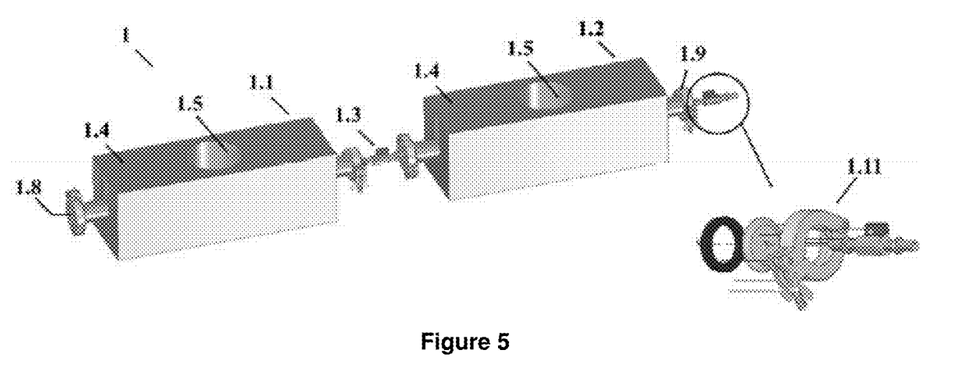
FIG. 5 shows a perspective view of the two-zone reactor scheme for carbon nanotubes production observed in FIG. 1.
Figure 6:
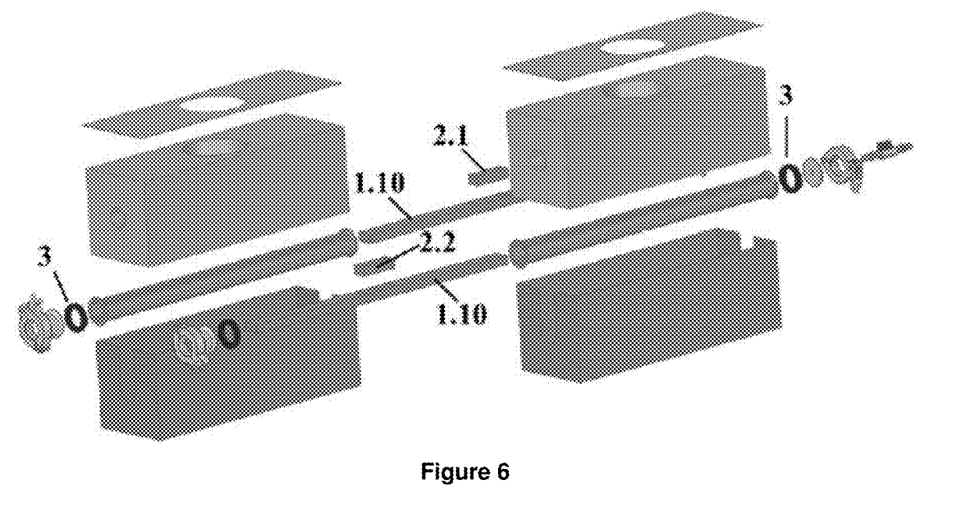
FIG. 6 shows an exploded view of the two-zone reactor scheme for carbon nanotubes production observed in FIG. 1.

The present invention provides a low cost and low complexity production system for obtaining carbon nanotubes (CNT) from carbonaceous matter (preferably plastic waste) including polypropylene, high density polyethylene, or mixtures of both, among others, and which use solar radiation as energy source; and synthesis method. FIG. 1 shows a scheme of the production system where the different components that make it up are appreciated. Meanwhile, FIGS. 2 and 3 show a top view and a front view of the system, respectively. In FIG. 4, a production system scheme is shown, where it is possible to observe the movement of the upper support medium along (X axis) and/or high (Y axis) with respect to the lower support medium, depending on the movement of the sun. FIGS. 5 and 6 show in detail a two-zone reactor scheme (a first zone of pyrolysis of carbonaceous matter and a second zone of synthesis of carbon nanotubes) that integrates the production system.

The carbon nanotube production system, which is subject of the present invention, is preferably formed by the following grouped components into two main subsystems and a third optional subsystem: 1) a sub-system of solar tracking in X and Y axes to sustain solar radiation in the two zones of the solar reactor, 2) a two-zone solar reactor sub-system for the production of carbon nanotubes, and 3), a sub-system for converting solar energy into electricity, storage and supply.

The solar tracking sub-system along the length (X axis) and altitude (Y axis) for sustaining solar radiation at one point, preferably comprises the following medium shown in FIGS. 1 and 2: a superior support medium (2), that in addition to providing stability, houses mediums (16) that allow the monitoring and concentration of the incident solar radiation in at least one focal point (17), these being preferably Fresnel lenses (6); at least four upper actuator mediums for positioning at least two Fresnel lenses (7); a central actuator medium (5), which allows the height of the upper medium to be adjusted in relation to a two-zone solar reactor (1) in order to control the radius of the circle of sunlight (17) generated by the concentration of solar radiation from each of the Fresnel lenses (6) on each zone of the solar reactor (1), the zone (1.1) of pyrolysis of carbonaceous matter and the zone (1.2) of production of carbon nanotubes; and a photosensing medium, preferably a photo detector (13) which cooperates with a balance set (8) for the movement of said upper support medium (2) according to the sun movement along (X axis) and/or high (Y axis), in order to follow the sun's path and thus keep the radius of the circle of sunlight at the same point, Where said balance set (8) comprises a hydraulic arm type actuator medium (10), a bearing-shaft type coupling medium (9) that receives the hydraulic arm type actuator medium (10), a lower support medium (12) of said hydraulic arm type actuator medium which serves as a support point for actuating said hydraulic arm type actuator medium (10) and which is attached to said lower support medium (3).

Said upper support medium (2) also comprises a central structural medium (4), which in addition to supporting said central actuator medium (5) allows maintaining the center of mass of the upper support medium (2). A control medium, preferably a control board (11) is attached to said lower support medium (3), containing electronic medium (not shown in the figure) for the actuator medium and a photo-detection medium, preferably, a photo-detector, so as to automatically or manually control the movement of said upper support medium (2) along (X axis) and/or high (Y axis), as well as the movement of said at least two Fresnel lenses (each independently) based on the information received from said photo-detection medium.

Said lower support mediums (3) can be fixed to the ground as shown in FIG. 1, or may have a displacement medium, preferably wheels, at the corners that allow the system to have additional movement in width or depth (Z axis).

With the sub-system described, it is possible to concentrate, in a radius of approx. 10 cm to 20.5 cm, temperatures on the surface of the solar reactor between 900° C.-1250° C. (depending on solar radiation, time and geographical location) and inside the reactor in each zone temperatures between 650° C.-1050° C. On the other hand, the solar tracking sub-system along (X axis) and/or high (Y axis) to sustain solar radiation at one point, in its upper support medium (2) has a range of motion in X and Y axis from an angle α=40°, to an angle β=40° (FIG. 3). The radius of the circle of sunlight (17) generated by the concentration of the solar radiation of each of the Fresnel lenses (6) on each zone of the solar reactor (1) can reach a maximum radius of 20.5 cm.

Additionally, in order to continuously feed with electric supply said electronic medium of the nanotube production system contained in said control medium, preferably a control board (11), the connection to an electrical network would be optional since the system integrates a third conventional subsystem (13) for the conversion of solar energy into electricity, for storage and supply.

Said subsystem (13) comprises a set of rechargeable energy mediums, preferably rechargeable batteries (not shown in the figures), electrical connection mediums (not shown in the figures), regulating mediums (not shown in the figures) and mediums to transform light energy into electrical energy, preferably photovoltaic cells (15). The subsystem (13) can power 220 volts with a power between 1500-2000 W to keep the production system operational for a period of 9 hours for 12 months (according to solar radiation characteristic of the city of Calama, Chile). The sub-system supplies electrical energy to each medium that requires it in the system (not shown in the figures).

FIG. 4 shows the distances that define the dimensions of the production system, with the A1 dimension between 2221 cm and 2421 cm, which defines the total height of the system taken from the base in the lower support medium (3), to the highest point of the upper support medium (2); the B1 dimension between 2540 cm to 2740 cm defines the total length of the system referred to the distance between ends of the axes coupled to the bearing mediums (9); the C1 dimension between 2340 cm to 2540 cm defines the total length of the upper support medium (2); the D1 dimensions between 1900 cm and 2100 cm, and E1 between 160 cm to 180 cm, define the length and height of the solar reactor of two zones (1) within the system, respectively; the F1 dimension, between 1210 cm to 1310 cm defines the maximum coupling point of the arm type actuator medium (10) with the middle bearing-shaft set (9); the G1 dimension, greater than or equal to 40 cm, defines the size of the control board. The system dimensions given by A1, B1, C1, D1, E1, and F1 must maintain a 1:1:1:1:1:1 ratio based on the lower limits of each dimension.

In FIGS. 5 and 6 the two-zone solar reactor (1) is shown in detail, which is placed on the upper support medium (2) supported on a base medium and anchored by fastening mediums, preferably, bolts to said base medium (not shown in the figures), in order to rotate together with the upper support medium (2), as shown in FIG. 3. The reactor (1) has a cylindrical shape and comprises a zone (1.1) of carbonaceous matter pyrolysis and a second zone of production of carbon nanotubes (1.2). The length of the pyrolysis zone (1.1) of carbonaceous matter can vary between 25-125 cm, and the length of the zone (1.2) of nanotube production can vary between 25-125 cm. The ratio between the length of the zone (1.1) of pyrolysis of carbonaceous matter and the length of the zone (1.2) of nanotube production is 2:1, 1:1, 1:2; the radius of the zone (1.1) of pyrolysis of carbonaceous matter and the zone (1.2) of nanotube production is 5.16 cm, being able to be optionally equal and have a ratio of radius from zone (1.1) to zone (1.2) 2:1, 1:1, 1:2.

The zones (1.1) of pyrolysis of carbonaceous matter and the zone (1.2) of nanotube production can optionally be connected by a flow regulating medium (1.3), which can be a flow control valve or any other type of valve; each zone outside can be made of stainless steel or any other heat conducting material (1.4) resistant to high temperatures (>900° C.); on the reactor, preferably a reactor tube, an insulating medium of mineral wool type (1.5) is placed where the thickness of said insulating layer can be between 1-10 cm, where the objective is to preserve the internal temperature inside each zone, the zone (1.1) of pyrolysis of carbonaceous matter or the zone (1.2) of nanotube production or both zones; the reactor (1) has a first temperature sensor placed on the outside of the reactor adjacent to the edge of the sunlight focus concentrated by the Fresnel lenses, in order to monitor the temperature outside the solar reactor, and a second temperature sensor in the internal part of each one of the zone (1.1) of pyrolysis of plastics and the zone (1.2) of nanotubes production, in order to monitor the temperature inside each zone, the zone (1.1) of pyrolysis of carbonaceous matter or the zone (1.2) of nanotube production or both zones; said first and second temperature sensors can be thermocouples of the K type or similar high temperature.

The data from the first and second temperature sensors allows the determine of process conditions, such that the operator or a computer program determines the adjustment of the height and orientation of the Fresnel lenses with respect to each one of the pyrolysis zone (1.1) of carbonaceous matter and the zone (1.2) of nanotube production, in order to achieve a process of pyrolysis of suitable carbonaceous matter and an optimal process of synthesis of nanotubes.

To feed the reactor (1) with carbonaceous raw matter (preferably plastic waste), including polypropylene, high density polyethylene or mixtures of both, among others, and at least one carbonaceous mater pyrolysis catalyst, and at least one nanotube production catalyst of carbon, the reactor (1) has a first gate (1.8) and a second gate (1.9) located at each end of each reactor zone, the carbonaceous matter pyrolysis zone (1.1) and the production zone (1.2) of nanotubes, sliding mediums, preferably rail medium (1.10) in each zone, the carbonaceous matter pyrolysis zone (1.1) and the carbon nanotube production zone (1.2), which slides and positions the mixture of carbonaceous matter (optionally with at least one pyrolysis catalyst) in the zone (1.1) of carbonaceous matter pyrolysis, and at least one carbon nanotube synthesis catalyst optionally mixed with a support medium, preferably a support medium of the zeolite type, in the zone (1.2) for the production of carbon nanotubes, the rail medium (1.10) is entered by said gates (1.8) and (1.9); said rail medium (1.10) can be made of stainless steel or other heat-conducting material and resistant to high temperatures (>1400° C.), and which can have a square, rectangular or any shape that allows the positioning of both the carbonaceous raw matter (preferably plastic waste) including polypropylene, high density polyethylene or mixtures of both, among others and at least one plastic pyrolysis catalyst such as zeolite HZMS-5 in the zone (1.1) of carbonaceous matter pyrolysis, as well as at least one catalyst for the synthesis of carbon nanotubes including catalyst based on nickel, cobalt, iron or mixtures thereof, optionally with a catalyst support medium, preferably a support medium of the zeolite type, in the zone (1.2) for the production of carbon nanotubes; the length and width dimensions of said rails (1.10) are determined by the dimensions of each zone of the reactor, the zone (1.1) of pyrolysis of carbonaceous matter and the zone (1.2) of production of carbon nanotubes.

The entry of each rail into each zone of the reactor (1) can be directly, or by an arm type support medium (not shown in the figure) that allows the operator to move away from the incident radiation on the reactor. Conveniently, the solar reactor in each of the carbonaceous matter pyrolysis zone (1.1) and the carbon nanotube production zone (1.2) may have pressure sensing mediums (not shown in the figure), said pressure sensors mediums could be to selected from manometer type sensor mediums.

The reactor is provided with a vacuum system (not shown in the Figures) which can be connected to any of said first gate (1.8) or second gate (1.9) of the reactor, which allows an evacuation of the air that is inside the reactor, preferably a reactor tube, the internal pressure can range from 0.5 to 1.0 atm, the latter value is dependent on the selected carbon nanotube synthesis catalyst.

In addition, this system can also optionally comprise mediums for entering an inert gas, where said inert gas is selected from N2 or Ar, to assist in the transportation of carbonaceous gases generated in the zone (1.1) of pyrolysis of carbonaceous matter to the zone (1.2) of production of carbon nanotubes and generate a protective environment favorable to the necessary reactions in at least one carbon nanotube synthesis catalyst.

For the nanotubes production, initially and optionally, the solar reactor (1) is prepared, through the cleaning of each zone, the zone (1.1) of pyrolysis of carbonaceous matter and the zone (1.2) of carbon nanotubes production. Said cleaning is carried out with an organic solvent and/or mechanical-abrasive mediums, where the solvent can be acetone and said mechanical-abrasive medium can be a brush or metal swab. Then, the reactor is placed on the upper support medium (2) supported on a base medium and anchored through fastening mediums, preferably bolts to said base medium (not shown in the figures). Carbonaceous matter is placed in the zone (2.1) of the rail medium (1.10) that connects with the pyrolysis zone (1.1) of carbonaceous matter, including polyethylene, polypropylene or mixtures of both, optionally with at least one pyrolysis catalyst (in the form of a bed, the pyrolysis catalyst may be commercial HZMS-5 zeolite or other state of the art catalyst for such purposes including aluminum oxides, silicon oxides, aluminosilicates mixtures, optionally with the presence of alkaline metals and alkaline earth, and in the zone (2.2) of the rail (1.10) that connects with the zone (1.2) of production of carbon nanotubes, at least one catalyst for the nanotubes production, which may be based on nickel, cobalt, iron, aluminum, or combinations of these, or oxides of said elements and their mixtures, among others reported in the state of the art for this purpose, optionally with a support (generally aluminosilicates or zeolites also reported in the state of art), this stage is called preparation of materials for the nanotubes production.

After this stage, the gate (1.8) or (1.9) of the solar reactor (1) is opened and the rail medium (1.10) is entered inside said reactor zones, the zone (1.1) of carbonaceous matter pyrolysis and the zone (1.2) of carbon nanotubes production. Once the carbonaceous raw matter is placed including polypropylene, high density polyethylene or mixtures of both, among others and at least one plastic pyrolysis catalyst, such as HZMS-5 zeolite, in the zone (1.1) of carbonaceous material pyrolysis, as well as of at least one carbon nanotube synthesis catalyst including catalysts based on nickel, cobalt, aluminum, iron or a mixture thereof, optionally with a catalyst support medium, preferably a zeolite type support medium, in the zone (1.2) for the carbon nanotubes production an environment adaptation process is carried out (only empty or empty together with gas filling).

After this, the different sensors (temperature and pressure) are connected, activating the control board (11). Through said panel (11), the solar tracking system (photo-detector and electronics) is activated in order to orient the upper support medium (2) in the direction of greater solar radiation at the start time of the production process (for example from 11:00 to 15:00, considering a maximum reaction time of nanotube production of 3 hours and maintenance of sunlight until 18:00 hours), with the help of the arm type actuator medium (10) and the bearing-shaft type medium (9), after this, the actuator mediums (5) and (7) for the positioning of the Fresnel lenses are activated, with the purpose that the focus of concentrated light of the lenses be positioned on each of the reactor zones, the carbonaceous matter pyrolysis zone (1.1) and the carbon nanotube production zone (1.2), and generate an internal temperature in each of the reactor zones, the carbonaceous matter pyrolysis zone (1.1) and nanotubes production zone (1.2), that goes from room temperature rising around 30° C./min to 480° C., this stage being known as reactor preheating.

The preheating of the reactor can last between 20-35 minutes, considering an initial temperature of plastic pyrolysis when it reaches 500° C. in the carbonaceous matter pyrolysis zone (1.1) and, 700° C. of carbon nanotube synthesis in the carbon nanotubes synthesis zone (1.2). Once the reactor reaches said internal temperatures in each of the reactor zones, the carbonaceous matter pyrolysis zone (1.1) and the carbon nanotubes production zone (1.2), between 500° C. to 700° C., it is considered a maximum time of 120 minutes to complete the pyrolysis and the carbon nanotubes production, this stage is known as carbonaceous matter pyrolysis and nanotubes production. The optimum temperatures for the plastic pyrolysis and carbon nanotubes synthesis can be in a range of 500-600° C. for the pyrolysis, and in a range of 700-1100° C. for carbon nanotubes synthesis. However, both reactions (carbonaceous matter pyrolysis and carbon nanotubes synthesis) can occur at the same temperature between 750° C.-950° C.

According to the sun's changing position (FIG. 3), the positioning system follows it through the movement of the upper support medium (2), so that the focal point (17) is not lost and therefore the temperature inside the reactor zones (1), the carbonaceous matter pyrolysis zone (1.1) and the carbon nanotube production zone (1.2) can be maintained during the nanotube production (FIG. 3). The time required for plastic pyrolysis and carbon nanotube production is between 90-120 minutes. Said plastic pyrolysis is carried out first and the hydrocarbon gases generated are transported to the carbon nanotubes production zone (1.2) due to the expansion, where in the presence of the catalyst for the carbon nanotubes production, the formation reaction of these begins.

After the reaction time, the actuator mediums (5) and (7) are activated to unfocus the Fresnel lens, (6) which ends the heating of the reactor immediately, this way the solar reactor (1) can be decoupled of the lower support mediums (3) to be placed in another zone for cooling and subsequent removal of products or by-products, according to the latter which are detailed below. Given the above, once the reactor (1) is decoupled, another reactor can be quickly placed to perform another carbon nanotubes synthesis with another rail medium, adjusting with the control board (11), the actuator mediums (5) and (7) to repeat the process described above. This allows the system to be simple in operation and can take full advantage of solar radiation during the day for the nanotubes production, without having to wait for the reactor to cool down (it may take several minutes) as is currently with state of the art technologies.

To ensure the operation of the two-zone solar reactor, once the rail medium (1.10) has been entered into the reactor (1) and the temperature conditions have been reached as described above, in the carbonaceous matter pyrolysis zone (1,1) plastic degradation reactions occur giving way to the formation of solid subproducts including waxes composed of carbon chain esters of 10-20 carbon atoms, amorphous carbon Cx, coke; liquids including chain oils of 10-14 carbon atoms, hydrocarbons such as hexane, heptane, octane, among others; and gaseous, including methane, ethane, propane, butane, among others. The use of pyrolysis catalyst improves the selectivity of species of lower molecular mass and in less time. On the other hand, in the carbon nanotubes production zone (1.2), nanotubes are generated by the effect of temperature when the gases from the pyrolysis zone are transported through the reactor, preferably a reactor tube, to the surface of the carbon nanotube synthesis catalyst.

FIG. 5 shows the vacuum connection (1.11) of the solar reactor (1), which allows air to escape from inside the two zones. Excess air has a negative effect, on one hand, it causes the carbonaceous matter to become carbon dioxide and water, compounds that are difficult to convert into nanotubes (special conditions, pressure and other types of catalysts are needed). On the other hand, if the carbon nanotube synthesis catalyst is a metal, it can be oxidized in the presence of oxygen and heat, with this, the performance can range from 0-3% of carbon nanotubes.

The scheme of FIG. 5, presents a flow control medium, preferably a key or intermediate valve (1.3), which can be in two positions, open (direct contact between the gases and the nanotube catalyst) or closed so that once the pyrolysis has started, the key can be opened, allowing saturation of the carbon nanotube synthesis zone (1.2) with the carbonaceous gases from the carbonaceous pyrolysis zone (1.1). This separation of zones depends on the use of at least one catalyst and the type of catalyst to be used, because some are sensitive to poisoning, especially semi-pyrolized species including amorphous carbon, Cx, coke carbon.

From FIG. 6, the use of seal mediums (3) can be observed, which must resist to high temperatures and prevent the permeation of the gases produced in the pyrolysis outwards, which allows a good catalysis in the carbon nanotube production.

Examples of Application

Carbon Nanotube Production

To illustrate the system operation, a carbon nanotube production system with a set of dimensions will be used according to the parameters defined in FIG. 1, these being: A1=2321 cm; B1=2640 cm; C1=2440 cm; D1=2000 cm; E1=170 cm; F1=1310 cm; G1=40 cm. Additionally, it is possible to use for this combination of parameters, a depth of 1240 cm in the upper support mediums (2), in order to incorporate square Fresnel lenses (6) of 1104 cm each side.

The solar reactor (1) is prepared, through the cleaning of each zone of the reactor, the carbonaceous matter pyrolysis zone (1.1) and the carbon nanotubes production zone (1.2), with acetone and through a mechanical-abrasive process, such as a brush or metal swab. Later, the reactor is placed on the upper support medium (2) supported on a base and anchored by bolts to said base. After this, the different sensors (temperature and pressure) are connected, activating the control panel (11). It is placed in the zone (2.1) of the rail (1.10) that connects with the zone (1.1) of carbonaceous matter pyrolysis, 4 g of a mixture of high density polyethylene/polypropylene on a 0.2 g bed of zeolite catalyst Commercial HZMS-5, and in the zone (2.2) of the rail (1.10) that connects with the zone (1.2) of carbon nanotubes production, 0.6 g of catalyst (nickel mixture: Zeolite A-33, in a 2:1 ratio) for the nanotubes production. Once the rail (1.10) has been put into said reactor zones (1), the carbonaceous matter pyrolysis zone (1.1) and the carbon nanotube production zone (1.2), using said board (11), the solar tracking system (photo-detector and electronics) is activated in order to orient said upper support medium (2) in the direction of greater solar radiation with the help of the actuator arm (10) and the bearing-shaft medium set (9), after this, the actuators (5) and (7) are activated for the positioning of the Fresnel lenses (6), with respect to the base that holds the solar reactor (1) at a height of 1700 cm, resulting in a light focus radius (17) of 100 mm, on each of the reactor zones (1), the carbonaceous matter pyrolysis zone (1.1) and the carbon nanotube production zone (1.2). The precursor materials are allowed to preheat for a time of 20 minutes at a temperature of approximately 480° C. After this time, the actuators (5) and (7) for the positioning of the Fresnel lenses (6) are actuated by the control board (11) to adjust the concentrated light focus of the lenses (17) on each one of the reactor zones (1), the carbonaceous matter pyrolysis zone (1.1) and the carbon nanotube production zone (1.2), within a radius of 75 mm. Under these dimensions and arrangement of Fresnel lenses (6), an internal temperature is generated in each of the reactor zones (1), the carbonaceous matter pyrolysis zone (1.1) and the carbon nanotube production zone (1.2), of approximately 900° C., resulting on the plastic pyrolysis reactions and the carbon nanotubes formation. The reaction time required for the plastic pyrolysis and carbon nanotubes production is set at 120 minutes. Once the reaction time is finished, the lenses are unfocused and the reactor is allowed to cool down to extract the products contained in the rail (1.10).

Characterization of Products Obtained in the Nanotube Production System

Figure 7:
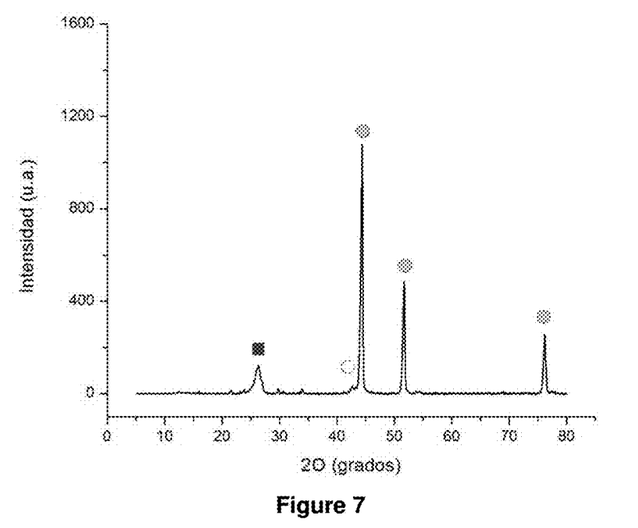
FIG. 7 shows a diffractogram made of solid products obtained in the zone (1.2) of the reactor (1) defined for the carbon nanotubes production, where the circle without filling is $N_2O$, the circles filled is $N_i$, and the square is CNTs.

FIG. 7 shows a diffractogram made of solid products obtained in the zone (1.2) of carbon nanotubes production in the reactor (1). The diffraction pattern allows the observation of the crystalline species present in the sample, in this case part of the Nickel catalyst (peaks 44.3°, 51.7° and 76.2°) and nickel oxide (peak 42.7°) are observed, as well as the characteristic signal of carbon nanotubes (26.3°) [Bussarin Ksapabutr et al. Facile and Low-Cost Synthesis of Ni/NiO Catalyst by Microwave Plasma Method for Carbon Nanotubes Growth Using Plastic Waste as Carbon Source. Advanced Science Letters 19 (2013) 268-272].

Figure 8:
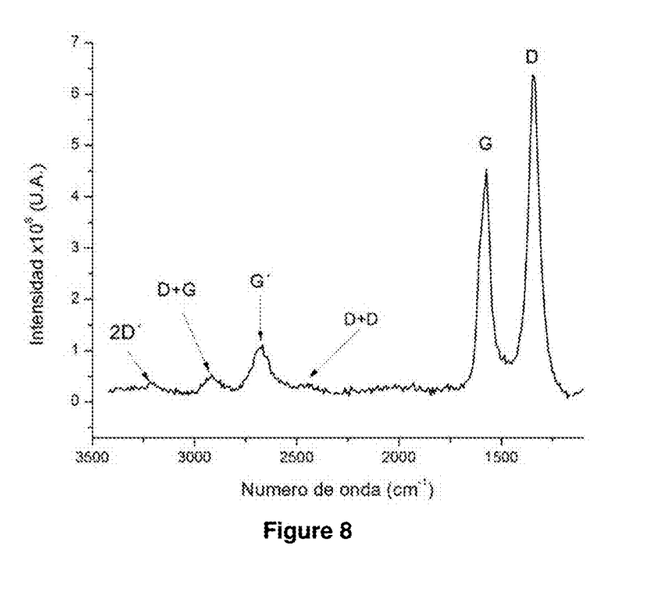
FIG. 8 shows a Rama Spectrum made to solid products obtained in the zone (1.2) of the reactor (1) defined for carbon nanotubes production.

FIG. 8 shows the Raman spectrum made to the solid products obtained in the carbon nanotube production zone (1.2) of the reactor (1). The spectrum shows two strongly pointed peaks accentuated at 1350 cm$^{-1}$ and another at 1570 cm$^{-1}$, which correspond to the band D and G respectively. The results are summarized in Table 1.

TABLE 1

Summary of the bands obtained by Raman spectroscopy.

| | Bands | | | | | |
|---|---|---|---|---|---|---|
| | Band D | | Band G | | Band G' | |
| | Wavenumber (cm$^{-1}$) | Intensity (U.A.) | Wavenumber (cm$^{-1}$) | Intensity (U.A.) | Wavenumber (cm$^{-1}$) | Intensity (cm$^{-1}$) |
| Sample taken | 1345 | 6,368 | 1572 | 4,532 | 1674 | 1,086 |

The D band is related to the disorder in the graphite network, while the G band, to the high frequency of the first order $E_{2g}$ mode of the graphite structure, whose $I_D/I_G$ ratio is commonly used as an indicator of the nanotubes' carbon graphitization. Thus, a low $I_D/I_G$ index shows that there are few defects in the carbon network of the nanotube walls [Liliane Bokobza et al. Raman Spectra of Carbon-Based Materials (from Graphite to Carbon Black) and of Some Silicone Composites. Carbon 1 (2015) 77-94].

Other bands related to crystallinity are also registered in the spectrum, the $I_G/I_D$ ratio is sensitive to the overall quality of the graphite crystalline network and increases as the surface extension of it increases.

TABLE 2

Determination of the ratios between spectrum bands of the evaluated sample.

| Index | $I_D/I_G$ | $I_G/I_D$ | $I_{G'}/I_G$ |
|---|---|---|---|
| Sample taken | 1.405 | 0.171 | 0.240 |

Figure 9A:
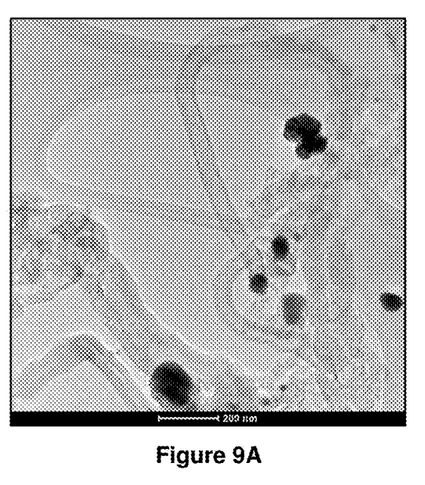
FIG. 9 shows Transmission Electron Microscopy (TEM) taken to solid products obtained in the zone (1.2) of the reactor (1) defined for carbon nanotubes production.
Figure 9B:
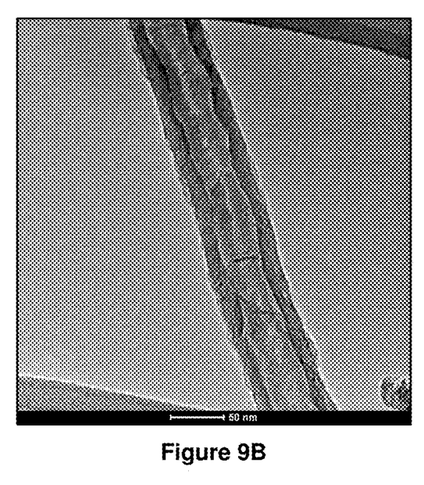

As can be seen in Table 2, the $I_D/I_G$ index (1,405) and $I_G/I_D$ (0,171) imply the presence of a large number of defects in the carbon network [Liliane Bokobza et al. Raman Spectra of Carbon-Based Materials (from Graphite to Carbon Black) and of Some Silicone Composites. Carbon 1 (2015) 77-94]. The $I_{G'}/I_G$ ratio (0.240) is an indication that we are in the presence of the MWCNTs [Oxana V. Kharissova et al. Variations of interlayer spacing in carbon nanotubes. RSC Advances 4 (2014) 30807-30815]. The absence of the RBM band (100-300 cm$^{-1}$) and the absence of the G-band bifurcation (1500-1700 cm$^{-1}$) corroborate the presence of multiple walled carbon nanotubes (MWCNTs) [John H. Lehman et. to the. Evaluating the characteristics of multiwall carbon nanotubes. Carbon 49 (2011) 2581-2602]. To immediately verify the presence of multiple walled carbon nanotubes in the samples and observe their morphology, FIG. 9A-B shows two images taken by transmission electron microscopy (TEM). The dark particles seen in the image correspond to nickel catalyst, which is outside the carbon nanotube (unreacted) and inside the carbon nanotube (FIG. 9A). FIG. 9B shows the approach to a multi walled carbon nanotube, it has an average internal diameter of 37 nm and an external diameter of 65 nm, since the distance between the layers of a nanotube is on average 0.34 nm [John H. Lehman et. Al. Evaluating the characteristics of multiwall carbon nanotubes. Carbon 49 (2011) 2581-2602], it can be indicated that the nanotubes obtained with a solar reactor system are made up of approximately 84±3 walls.

The invention claimed is:

1. A system for obtaining carbon nanotubes (CNT) from carbonaceous matter using solar radiation as energy source comprising:

a) a solar tracking sub-system along of a length of the system or X axis and at altitude or Y axis to provide solar radiation to two zones of a two-zone solar reactor, comprising:

a.1) an upper support providing stability, housing Fresnel lenses that allow the tracking and concentration of incident solar radiation in at least one focal point;

a.2) at least four upper actuators for positioning at least two Fresnel lenses;

a.3) a central actuator to fit a height of said upper support in relation to said two-zone solar reactor in order to control a circle radius of sunlight generated by the concentration of solar radiation, and a.4) a photo-detector that cooperates with a balance set for moving said upper support according to the sun's path and keeping the circle radius of sunlight at a same point, wherein said balance set comprises:
i) a hydraulic arm actuator,
ii) a bearing-shaft coupling that receives the hydraulic arm actuator, and
iii) a lower support of the hydraulic arm actuator, which serves as a support point to actuate said actuator and which is adhered to said lower support; wherein said upper support comprises a central structure that supports said central actuator and keeps the center of mass of said upper support;

a control board adhered to said lower support, containing a controller for said central actuator and said photo-detector, in order to automatically or manually control the movement of said upper support along the length of system (X axis) and/or altitude (Y axis) and said at least two Fresnel lenses each independently, based on the information received from the photo-detector, and a base where the solar reactor is coupled in order to be able to rotate together with the upper support structure;

b) a two-zone solar reactor sub-system comprising a two-zone reactor, a carbonaceous matter pyrolysis zone and a carbon nanotube synthesis zone, which may be separated by use of at least one catalyst; and optionally c) an energy conversion sub-system to convert solar to electrical energy that continuously feeds the controller of said control board with electrical energy, and which comprises a system for solar to electrical energy conversion.

2. The system of claim 1, WHEREIN said lower support is fixed to the ground or has wheels that allow a movement in depth/width (Z axis).

3. The system of claim 1, WHEREIN said upper support has a range of motion in X and Y axes with respect to the lower support from an angle $\alpha=40°$, measured counterclockwise from the X axis to an angle $\beta=40°$, measured clockwise from the X axis.

4. The system of claim 1, WHEREIN said radius of the circle of sunlight generated by the concentration of the solar radiation of each of the Fresnel lenses on each solar reactor zone reaches a maximum radius of 20.5 cm.

5. The system of claim 1, WHEREIN said system for solar to electrical energy conversion is selected from rechargeable batteries, an electrical connection, a regulating device and photovoltaic cells for transforming light energy into electrical energy.

6. The system of claim 1, WHEREIN a ratio of a total height taken from the base in said lower support to the highest point of said upper support, to a total length referred to a distance between the ends of the axes coupled to said bearing-shaft coupling, to a total length of said upper support, to a length of said reactor, to the height of said reactor, to the maximum coupling point of said hydraulic arm with said bearing-shaft coupling is as 1:1:1:1:1.

7. The system of claim 1, WHEREIN a ratio of the length of said carbonaceous matter pyrolysis zone to said carbon nanotube synthesis zone is 2:1, 1:1 or 1:2.

8. The system of claim 1, WHEREIN said carbonaceous matter pyrolysis zone and said carbon nanotube synthesis zone are made of a heat conducting material resistant to temperatures greater than 900° C.

9. The system of claim 1, WHEREIN said reactor has an insulator.

10. The system of claim 1, WHEREIN said reactor has a first temperature sensor and a second temperature sensor, said first temperature sensor is located on the outside of the reactor, adjacent to the edge of the sunlight focus which is concentrated by the Fresnel lenses in order to monitor the temperature outside of it, and said second temperature sensor is located in the inner part of each of the carbonaceous matter pyrolysis zone and the carbon nanotube synthesis zone, in order to monitor the temperature inside the carbonaceous matter pyrolysis zone and carbon nanotube synthesis zone.

11. The system of claim 1, WHEREIN said solar reactor in each of said carbonaceous material pyrolysis zone and said nanotube synthesis zone has pressure sensors.

12. The system of claim 1, further comprising a vacuum system that allows the evacuation of the air which is located inside the two-zone solar reactor.

13. The system of claim 1, further comprising an inlet for entering an inert gas into the reactor to help the transportation of the carbonaceous gases generated in the carbonaceous material pyrolysis zone to the synthesis zone and generate a protective environment favorable to the reactions in the carbon nanotube synthesis catalyst.

14. The system of claim 1, WHEREIN the carbonaceous matter pyrolysis zone and the carbon nanotube synthesis zone comprises a sealant resistant to high temperatures and preventing gas permeation produced in pyrolysis outwards.

15. The system of claim 1, WHEREIN the carbonaceous matter is plastic waste including polypropylene, high density polypropylene or mixture of both.

16. The system of claim 1, WHEREIN said carbonaceous matter pyrolysis zone and said carbon nanotubes synthesis zone are connected.

17. The system of claim 16, WHEREIN said carbonaceous matter pyrolysis zone and said carbon nanotube synthesis zone are connected by a flow regulator.

18. The system of claim 17, WHEREIN said flow regulator is a valve or a flow valve.

19. The system of claim 1, WHEREIN said reactor has a first gate and a second gate for feeding the reactor with carbonaceous raw material including polypropylene, high density polyethylene or mixtures of both, at least one plastic pyrolysis catalyst and at least one carbon nanotube synthesis catalyst.

20. The system of claim 19, WHEREIN said at least one carbon nanotube synthesis catalyst is a catalyst based on nickel, cobalt, iron, aluminum and zeolite, or combinations thereof.

21. The system of claim 19, WHEREIN said first gate and second gate are located at each end of each carbonaceous matter pyrolysis zone and carbon nanotube synthesis zone of the reactor.

22. The system of claim 21, WHEREIN said first gate and second gate comprise sliding rails for sliding and positioning the mixture of carbonaceous material and optionally the mixture of carbonaceous material and said at least one plastic pyrolysis catalyst, in the carbonaceous material pyrolysis zone.

23. The system of claim 22, WHEREIN said at least one plastic pyrolysis catalyst is a catalyst based on aluminum oxides, silicon oxides, mixtures in aluminosilicates, optionally with the presence of alkali and alkaline earth metals.

24. The system of claim 22, WHEREIN said rails enter directly into each zone of the reactor or through an arm support that allows an operator to move away from the incident radiation on the reactor.

25. The system of claim 22, WHEREIN said rails are made of a heat conducting material that resists temperatures above 1400° C.

26. The system of claim 25, WHEREIN said heat conducting material is stainless steel.

27. The system of claim 19, WHEREIN said at least one plastic pyrolysis catalyst and at least one carbon nanotube synthesis catalyst is mixed with a support.

28. The system of claim 27, WHEREIN said support is a silicate or zeolite aluminum.

29. A method for producing carbon nanotubes (CNT) from carbonaceous matter and using solar radiation as an energy source characterized by comprising:
   a) placing a solar reactor on a lower support medium supported on a base medium and anchored through fastening bolts to said base medium,
   b) placing carbonaceous raw matter including polypropylene, high density polyethylene or mixtures of both and at least one plastic pyrolysis catalyst in a carbonaceous matter pyrolysis zone and a carbon nanotube synthesis catalyst including a catalyst based on nickel, cobalt, iron and a combination of two or more thereof, optionally with a support in a carbon nanotube synthesis zone of the reactor by entering through a first gate and a second gate of the solar reactor and by sliding rails,
   c) controlling temperature and pressure in the carbonaceous matter pyrolysis zone and the carbon nanotube synthesis zone,
   d) activating a solar tracking system in order to orient an upper support medium in the direction of the largest solar radiation,
   e) actuating the actuator mediums for positioning the Fresnel lenses so that the focus of concentrated light is positioned on the carbonaceous matter pyrolysis zone and the carbon nanotube synthesis zone,
   f) preheating the carbonaceous matter pyrolysis zone and the carbon nanotubes production zone of the reactor from room temperature to a reaction temperature in the range of from 500 to 800° C. in the carbonaceous matter pyrolysis zone and in the carbon nanotube synthesis zone.

30. The method of claim 29, WHEREIN after stage b), stage b' is performed which comprises setting the solar reactor by emptying inside it or by making vacuum and allowing inert gases to enter inside.

31. The method of claim 29, WHEREIN the carbonaceous matter is plastic waste comprising polypropylene, high density polypropylene or mixture of both.

32. The method of claim 29, WHEREIN before stage a), stage a' is performed which comprises preparing the solar reactor to ensure cleanliness of the carbonaceous matter pyrolysis zone and the carbon nanotube synthesis zone.

33. The method of claim 32, WHEREIN cleaning stage a' is carried out with an organic solvent, a mechanical-abrasive medium or a combination of both.

\* \* \* \* \*